United States Patent Office 3,116,319
Patented Dec. 31, 1963

3,116,319
SYNTHESIS OF AMINOMETHYLENE MALONONITRILE
Martha Creighton and Willy Leimgruber, Nutley, N.J., assignors to Hoffmann-La Roche Inc., Nutley, N.J., a corporation of New Jersey
No Drawing. Filed May 14, 1962, Ser. No. 194,673
6 Claims. (Cl. 260—465.5)

Aminomethylene malononitrile is a known chemical, particularly valuable for its use as an intermediate in the synthesis of vitamin $B_1$. The purpose of this invention is to provide a simple and economical synthesis of aminomethylene malononitrile. More particularly, the purpose of this invention is to provide a synthesis of aminomethylene malononitrile which yields the product in a quality suitable for further reaction so that it can serve as an intermediate in the synthesis of vitamin $B_1$. The use of aminomethylene malononitrile as an intermediate in the synthesis of vitamin $B_1$ is described in, among other places, U.S.P. 2,184,720 issued December 26, 1939, to Matukawa et al.

Amonimethylene malononitrile can be represented by the formula $(CN)_2C=CHNH_2$. A particular purpose of this invention is to provide a one-step synthesis of aminomethylene malononitrile from malononitrile. More particularly, the process of this invention comprises the preparation of aminomethylene malononitrile via reaction of malononitrile, dimethyl sulfate and formamide. The reaction can be conducted by simply mixing the three reactants and permitting them to react. The three reactants can be used in any molar ratio, but it has been found preferable to use a molar ratio of formamide to dimethyl sulfate of at least 2:1. Also, it has been found preferable to use a molar ratio of formamide to malononitrile of at least 2:1. In an especially preferred embodiment the reactants are used in a molar ratio of formamide: dimethyl sulfate:malononitrile=4:2:1. Thus, though the reaction of this invention can be effected with any relative molar concentration of reactants, it is seen that a preferred embodiment of the invention comprises the reaction of malononitrile, dimethyl sulfate and formamide wherein at least 2 moles of formamide is used for 1 mole of each of the other reactants.

The above described reaction can be conducted using one of the reactants, i.e. formamide, as the solvent or reaction medium. However, it is preferred to use an inert organic solvent for the reactants; for example, hydrocarbons, such as benzene, ethers such as bis[2-methoxyethyl]-ether, dioxane, tetrahydrofuran, or the like. The preferred solvent is benzene. The three reactants can be intermixed simultaneously or they can be added to one another in any sequence. For simplicity of operation, it is preferred to add all three reactants at once.

The rate of reaction of this invention has been found to be temperature dependent. The reaction can be conducted at room temperature or at lower or higher temperatures (up to the boiling point of the reaction medium). It has, however, been found especially suitable to conduct the reaction at temperatures between about 40° C. and about 70° C. Lower temperatures, such as room temperature, can be used. However, it is especially preferred to conduct the reaction at a temperature of about 55° C. The reaction commences upon mixing of the reactants, and therefore the reaction time is not critical. However, it has been found that optimum yields are obtained in the course of about 18 to 20 hours. Of course, with temperatures below the preferred temperature range of about 40° C. to about 70° C. longer reaction periods are necessary to obtain optimum yields.

In an especially preferred embodiment of the invention, the reaction mixture is submitted to treatment with ammonia subsequent to completion of the reaction. It has been found that this treatment with ammonia increases the yield of aminomethylene malononitrile. The ammonia can be added until the maximum yield of aminomethylene malononitrile (determined, for example, spectroscopically) is obtained. The ammonia can be added to the reaction mixture in any form, for example, a methanolic ammonia solution can be added to the reaction mixture or at a suitable low temperature, pure liquid ammonia can be added to the reaction mixture. In another alternative, the solvents, if any, can be removed from the reaction mixture, and the remaining residue can be dissolved in a solvent (such as a lower alkanol as methanol), and gaseous ammonia can then be passed through the so-formed solution.

The following examples are illustrative but not limitative of the invention. As is readily apparent to those skilled in the art, variations in manipulative procedure can be effected and are within the scope of the instant invention. All temperatures are stated in degrees centigrade.

Example 1

In a 500 ml. flask equipped with a stirrer, thermometer and reflux condenser and immersed in an oil bath, were placed 13.2 g. of malononitrile (0.2 mole), 36.0 g. of formamide (0.8 mole), 50.4 g. of dimethyl sulfate (0.4 mole) and 300 ml. of benzene. The heterogeneous mixture was stirred rapidly and heated at 55° for twenty hours. The mixture was cooled to 10° and 14 ml. of 7.2 N solution of anhydrous ammonia in methanol was slowly added. Stirring at 10–12° was continued for one-half hour. The resultant solution was evaporated to dryness and the remaining syrup dissolved in water. The aqueous solution was repeatedly extracted with ethylacetate. The ethylacetate extracts were combined and dried over a mixture of 20 g. of sodium sulfate and 1 g. of charcoal. The mixture was filtered through a hyflo bed and the solids washed with small portions of ethylacetate. The combined filtrates were evaporated to dryness yielding crude aminomethylene malononitrile suitable for further reaction.

Example 2

6.6 g. (0.10 mole) of pure malononitrile, 11.5 ml. (0.29 mole) of formamide (dest.), 13.5 ml. of (0.14 mole) of dimethyl sulfate (dest.), and 150 ml. of dry benzene were placed in a round-bottomed flask equipped with a reflux condenser and a vibrator (vibro-mixer; Fisher Scientific Co.). The mixture was vibrated in order to get a homogeneous suspension, and then heated by means of a water bath at 55° for 18–20 hours. The reaction mixture was then allowed to cool and transferred with methanol washings into a round-bottomed flask. The benzene was removed in vacuo by means of a rotary evaporator and the remaining liquid residue dissolved in 150 ml. of absolute methanol. A slow stream of gaseous ammonia was then passed through the solution for about 30 minutes under cooling with ice water.

The methanolic solution of the reaction mixture was taken to complete dryness in vacuo (high vacuum was applied in order to remove the solvents completely), leaving an amber, partially crystalline residue which was suspended in 200 ml. of absolute dioxane (distilled over sodium) and stirred (magnetic stirring) overnight. The homogeneous mixture was filtered and the crystals remaining on the filter were washed with dioxane. The turbid dioxane solution was concentrated and taken to complete dryness in vacuo. The remaining residue was stirred (magnetic stirring) with 1 liter of dry ether for half an hour, and the ether phase then decanted. This ether extraction was repeated three times, the remaining residue discarded, the extracts combined and taken to dryness. The crude, crystalline aminomethylene malononitrile so-obtained was suitable for further reaction. If desired, this material could be converted into pure, crystalline aminomethylene malononitrile by chromatography on aluminum oxide.

Aminomethylene malononitrile was also prepared using the above procedure, maintaining the temperature between ca. 50° and 60° and using the below designated solvents and quantities of reactants (.1 mole of malononitrile, except where indicated).

| Exp. | Mole ratio of formamide/ dimethyl sulfate/ malononitrile | Solvent |
| --- | --- | --- |
| 3 | 2.9:1.4:1 | None. |
| 4 | 1.4:1.4:1 | Do. |
| 5 | 7.2:1.4:1 | Do. |
| 6 | 2.9:1.4:1 | Benzene. |
| 7 [a] | 2.9:1.4:1 | Do. |
| 8 | 1.4:1.4:1 | Do. |
| 9 | 2.9:1.4:1 | bis[2-methoxyethyl]ether. |

[a] This experiment was conducted at a different scale, using 0.2 mole of malononitrile.

We claim:
1. A process for the preparation of aminomethylene malononitrile which comprises mixing formamide, dimethyl sulfate and malononitrile, and permitting the so-mixed reactants to react at a temperature between room temperature and the boiling point of the reaction medium.
2. A process as in claim 1 comprising a second reaction step of adding ammonia to the reaction mixture following reaction of the initial ingredients.
3. A reaction as in claim 1 wherein the molar ratio of formamide to dimethyl sulfate is at least 2:1, and the molar ratio of formamide to malononitrile is at least 2:1.
4. A process for the preparation of aminomethylene malononitrile which comprises heating to a temperature between about 40° C. and about 70° C. a mixture of formamide, dimethyl sulfate and malononitrile.
5. A process for the preparation of aminomethylene malononitrile which comprises heating to a temperature of from about 40° C. to about 70° C. a mixture of formamide, dimethyl sulfate and malononitrile wherein the reactants are present in a molar ratio respectively of X:Y:1, X being at least 2 and Y being at least 1.
6. A process as in claim 5 wherein the molar ratio is 4:2:1.

No references cited.